US008990890B2

(12) United States Patent
Rahman et al.

(10) Patent No.: US 8,990,890 B2
(45) Date of Patent: Mar. 24, 2015

(54) ENABLING PRESENCE INFORMATION ACCESS AND AUTHORIZATION FOR HOME NETWORK TELEPHONY

(75) Inventors: Mahfuzur Rahman, San Jose, CA (US); Russell Berkoff, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 13/095,118

(22) Filed: Apr. 27, 2011

(65) Prior Publication Data

US 2012/0131640 A1 May 24, 2012

Related U.S. Application Data

(66) Substitute for application No. 61/415,720, filed on Nov. 19, 2010.

(51) Int. Cl.
*H04L 29/06* (2006.01)
*H04L 29/08* (2006.01)
*G06F 21/62* (2013.01)

(52) U.S. Cl.
CPC ........ *H04L 65/1016* (2013.01); *H04L 65/1006* (2013.01); *H04L 67/24* (2013.01); *G06F 21/6245* (2013.01)
USPC .......... 726/3; 726/2; 726/4; 726/21; 713/172; 713/173; 713/174; 713/156; 713/157; 713/158; 709/238; 709/244; 370/225; 370/401

(58) Field of Classification Search
CPC . H04L 63/08; H04L 12/2812; H04L 12/2803; H04L 12/2809

USPC ...................... 726/2–4, 21; 709/223–224, 22, 709/238–244; 370/225, 401; 713/172–175, 713/156–158
See application file for complete search history.

(56) References Cited

U.S. PATENT DOCUMENTS

| 7,818,784 | B2 * | 10/2010 | Kunito et al. ..................... 726/2 |
| 2005/0213609 | A1 * | 9/2005 | Brusilovsky et al. ......... 370/474 |
| 2007/0207777 | A1 * | 9/2007 | Owen et al. ..................... 455/411 |
| 2008/0095344 | A1 * | 4/2008 | Jachner ........................ 379/133 |
| 2008/0279161 | A1 * | 11/2008 | Stirbu et al. ................... 370/338 |
| 2009/0300158 | A1 * | 12/2009 | Bobde et al. .................. 709/223 |
| 2010/0166161 | A1 * | 7/2010 | Dhawan et al. ............ 379/88.19 |

(Continued)

OTHER PUBLICATIONS

Allen E. Milewski et al., Providing Presence Cues to Telephone Users, Dec. 2-6, 2000, ACM, pp. 89-96.*

(Continued)

*Primary Examiner* — Bradley Holder
*Assistant Examiner* — Fahimeh Mohammadi
(74) *Attorney, Agent, or Firm* — Sherman IP LLP; Kenneth L. Sherman; Steven Laut

(57) ABSTRACT

In a first embodiment of the present invention, a method for operating a presence server in a home network is provided, the method comprising: receiving a request for presence information; sending an event notification to all subscribed control points informing them of the request for presence information; receiving an action from one of the subscribed control points accepting or rejecting the request for presence information; and if the action received from the one of the subscribed control points accepts the request for presence information, causing presence information regarding the one of the subscribed control points to be sent to the entity that sent the request for presence information.

14 Claims, 7 Drawing Sheets

(56) References Cited

U.S. PATENT DOCUMENTS

| | | | |
|---|---|---|---|
| 2010/0166162 A1* | 7/2010 | Mueller et al. | 379/93.01 |
| 2010/0205662 A1* | 8/2010 | Ibrahim et al. | 726/7 |
| 2010/0208746 A1* | 8/2010 | Rahman | 370/464 |
| 2010/0269169 A1* | 10/2010 | Huang | 726/12 |
| 2011/0038469 A1* | 2/2011 | Clark et al. | 379/130 |
| 2012/0282922 A1* | 11/2012 | Fodor et al. | 455/426.1 |
| 2012/0324541 A1* | 12/2012 | Palacios Valverde | 726/4 |

OTHER PUBLICATIONS

Wenyu Jiang et al., Integrating Internet Telephony Services, Aug. 7, 2002, IEEE, vol. 6, Issue 3, pp. 64-72.*
Steven J. Vaughan-Nichols, Presence Technology: More than Just Instant Messaging, Oct. 14, 2003, IEEE, vol. 36, Issue 10, pp. 11-13.*
Akshai Parthasarathy, Push to Talk over Cellular (PoC) Server, Mar. 19-22, 2005, IEEE, pp. 772-776.*

* cited by examiner

ENABLING PRESENCE INFORMATION ACCESS AND AUTHORIZATION FOR HOME NETWORK TELEPHONY

This application claims the benefit of priority under 35 U.S.C. 119(e) to U.S. Provisional Patent Application No. 61/415,720, filed Nov. 29, 2010, which is incorporated herein by reference for all purposes.

BACKGROUND OF THE INVENTION

1. Field of the Invention

The present invention relates generally to home networking. More specifically, the present invention relates to the enabling of access to and authorization for presence information for home network telephony.

2. Description of the Related Art

Home networking has advanced from the early days of merely linking computers and printers to the modern home network, which can include mobile devices, televisions, set-top boxes, refrigerators, etc.

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

Voice over Internet Protocol (VoIP) is a general term for a family of transmission technologies for delivery of voice communications over the Internet or other packet-switched networks. Other terms frequently encountered and synonymous with VoIP are IP telephony and Internet telephony, as well as voice over broadband, broadband telephony, and broadband phone, when the network connectivity is available over broadband Internet access.

VoIP systems usually interface with the traditional public switched telephone network (PSTN) to allow for transparent phone communications worldwide. VoIP can be a benefit for reducing communication and infrastructure costs by routing phone calls over existing data networks and avoiding duplicate network systems. Skype™ and Vonage™ are notable service provider examples that have achieved widespread user and customer acceptance and market penetration.

Voice-over-IP systems carry telephony speech as digital audio, typically reduced in data rate using speech data compression techniques, packetized in small units of typically tens of milliseconds of speech, and encapsulated in a packet stream over IP.

The Session Initiation Protocol (SIP) is a VoIP signaling protocol, widely used for setting up and tearing down multimedia communication sessions such as voice and video calls over the Internet. The protocol can be used for creating, modifying and terminating two-party (unicast) or multiparty (multicast) sessions consisting of one or several media streams. The modification can involve changing addresses or ports, inviting more participants, adding or deleting media streams, etc.

SIP clients typically use TCP or UDP (typically on port 5060 and/or 5061) to connect to SIP servers and other SIP endpoints. SIP is primarily used in setting up and tearing down voice or video calls.

A motivating goal for SIP was to provide a signaling and call setup protocol for IP-based communications that can support a superset of the call processing functions and features present in the public switched telephone network (PSTN). SIP by itself does not define these features; rather, its focus is call-setup and signaling. However, it was designed to enable the construction of functionalities of network elements designated Proxy Servers and User Agents. These are features that permit familiar telephone-like operations: dialing a number, causing a phone to ring, hearing ringback tones or a busy signal. Implementation and terminology are different in the SIP world but to the end-user, the behavior is similar.

SIP-enabled telephony networks can also implement many of the more advanced call processing features present in Signaling System 7 (SS7), though the two protocols themselves are very different. SS7 is a centralized protocol, characterized by a complex central network architecture and dumb endpoints (traditional telephone handsets). SIP is a peer-to-peer protocol, thus it requires only a simple (and thus scalable) core network with intelligence distributed to the network edge, embedded in endpoints (terminating devices built in either hardware or software). SIP features are implemented in the communicating endpoints (i.e. at the edge of the network) contrary to traditional SS7 features, which are implemented in the network.

Recently, VoIP has been extended to mobile devices such as cellular phones. There are several methodologies by which a mobile handset can be integrated into a VoIP network. One implementation turns the mobile device into a standard SIP client, which then uses a data network to send and receive SIP messaging, and to send and receive RTP for the voice path. This methodology of turning a mobile handset into a standard SIP client requires that the mobile handset support, at minimum, high speed IP communications. In this application, standard VoIP protocols (typically SIP) can be used over any broadband IP-capable wireless network connection.

Another implementation of mobile integration uses a softswitch like gateway to bridge SIP and RTP into the mobile network's SS7 infrastructure. In this implementation, the mobile handset continues to operate as it always has (as a GSM or CDMA based device), but now it can be controlled by a SIP application server which can now provide advanced SIP based services to it. Several vendors offer this kind of capability today.

Mobile VoIP will require a compromise between economy and mobility. For example, Voice over Wi-Fi offers potentially free service but is only available within the coverage area of a Wi-Fi Access Point. High speed services from mobile operators may have better audio quality and capabilities for metropolitan-wide coverage including fast handoffs among mobile base stations, yet it will cost more than the typical Wi-Fi-based VoIP service.

Mobile VoIP will become an important service in the coming years as device manufacturers exploit more powerful processors and less costly memory to meet user needs for ever-more "power in their pocket". Smartphones are capable of sending and receiving email, browsing the web and in some cases allowing a user to watch TV.

As UPnP grows in popularity, more and more devices in the home are going to be networked. One particularly attractive notion is to integrate a digital television set into a UPnP network to allow users to access network functions through their television.

SUMMARY OF THE INVENTION

In a first embodiment of the present invention, a method for operating a presence server in a home network is provided, the method comprising: receiving a request for presence information; sending an event notification to all subscribed control points informing them of the request for presence information; receiving an action from one of the subscribed control points accepting or rejecting the request for presence information; and if the action received from the one of the subscribed control points accepts the request for presence information, causing presence information regarding the one of the subscribed control points to be sent to the entity that sent the request for presence information.

In a second embodiment of the present invention, a method for operating a presence server in a home network is provided, the method comprising: receiving an action from one or more control points in the home network indicating a list of entities that are permitted to access presence information corresponding to a user; receiving a request for presence information of the user; determining if the request for presence information was received by one of the entities listed in the list of entities as being permitted to access presence information corresponding to the user; and cause presence information corresponding to the user to the entity from which the request for presence information was received based on the determination and not based on consulting control points in the home network at the time the request for presence information is received.

In a third embodiment of the present invention, a telephony server is provided comprising: a telephony module configured to receive incoming phone calls and assign the incoming phone calls to one or more devices in the home network; a presence module configured to: receive a request for presence information; send an event notification to all subscribed control points informing them of the request for presence information; receive an action from one of the subscribed control points accepting or rejecting the request for presence information; and if the action received from the one of the subscribed control points accepts the request for presence information, cause presence information regarding the one of the subscribed control points to be sent to the entity that sent the request for presence information.

In a fourth embodiment of the present invention, an apparatus is provided comprising: means for receiving an action from one or more control points in a home network indicating a list of entities that are permitted to access presence information corresponding to a user; means for receiving a request for presence information of the user; means for determining if the request for presence information was received by one of the entities listed in the list of entities as being permitted to access presence information corresponding to the user; and means for causing presence information corresponding to the user to be sent to the entity from which the causing presence information regarding the one of the subscribed control points to be sent to the entity that sent the request for presence information.

In a fifth embodiment of the present invention, a non-transitory program storage device readable by a machine tangibly embodying a program of instructions executable by the machine to perform a method for operating a presence server in a home network is provided, the method comprising: receiving a request for presence information; sending an event notification to all subscribed control points informing them of the request for presence information; receiving an action from one of the subscribed control points accepting or rejecting the request for presence information; if the action received from the one of the subscribed control points accepts the request for presence information, causing presence information regarding the one of the subscribed control points to be sent to the entity that sent the request for presence information.

DETAILED DESCRIPTION OF SPECIFIC EMBODIMENTS

Figure 1:
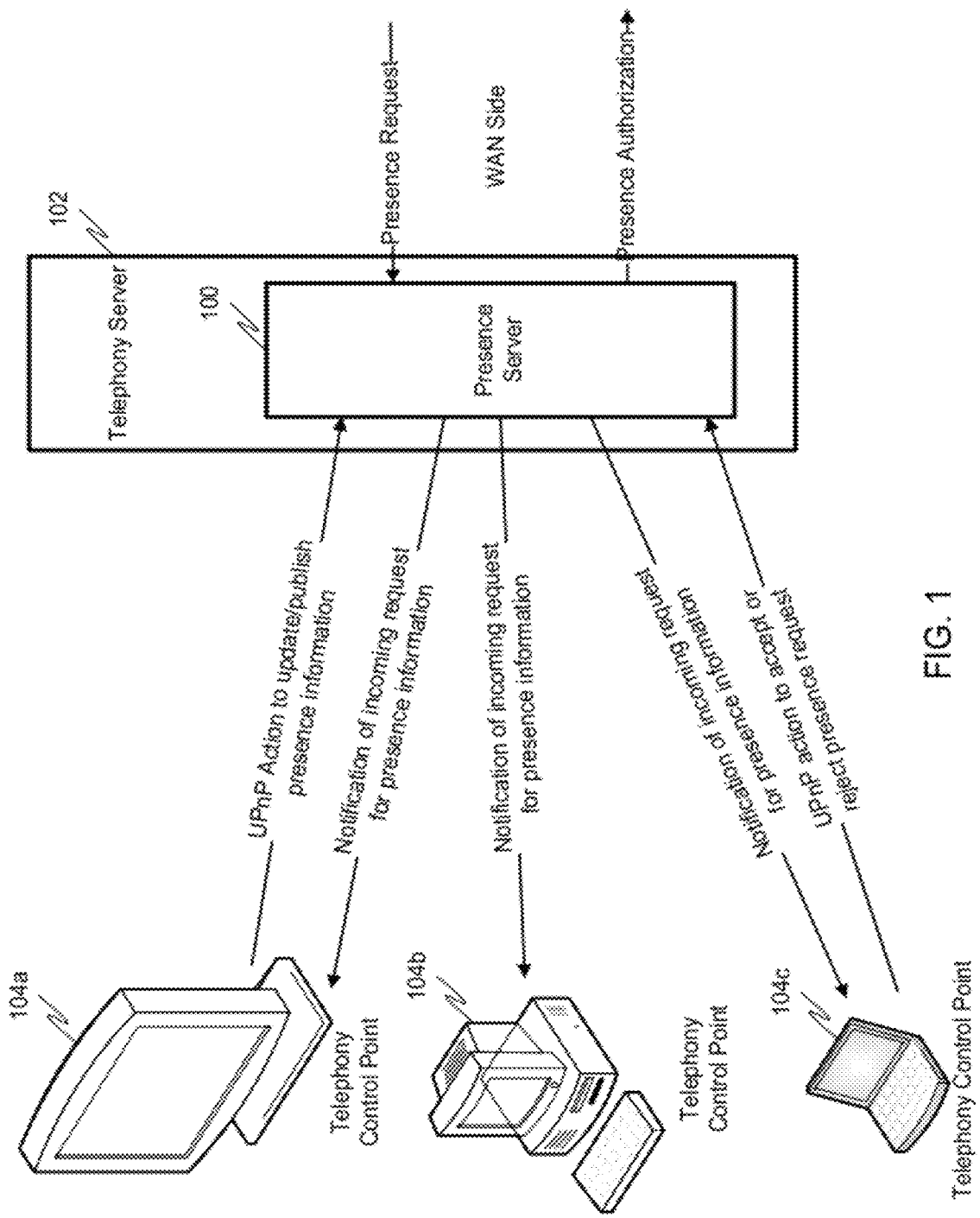
FIG. 1 is a block diagram illustrating an architecture for providing presence information in a home network in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

The present invention involves enabling presence information to be accessed (and authorized) in a home network, such as a UPnP network. Presence information includes a wide range of metadata regarding a user, such as the user's availability, location of the user (geographical or relative), device the user is using, capability of the device, etc. Availability information indicates the ability of the user to accept or reject a call or participate in an instant messaging or SMS/MMS session.

Presence information regarding users that are operating outside of a home network can be made available to users inside the home network via a presence server. The presence server may be a software element that can be part of a UPnP telephony server (i.e., a telephony server with presence capabilities). A telephony server is a home networking server that acts as a central point for incoming (and possibly outgoing) telephone calls. Typically, each telephony server will represent a single phone number that can be shared among multiple devices in the home network (and multiple users as well). Typically, a separate phone number will be referred to as a separate telephony server, although from an architecture standpoint both "servers" may reside on a single device.

A telephony server typically has a Uniform Resource Identifier (URI) or similar mechanism for identifying its location. In SIP environments, this may be a SIP URI. This URI can be used either alone, to reference all users of the telephony server, or may be appended to a user name to identify an individual user of the telephone line.

The presence server (also called a presence module) gathers presence information from different sources, including SIP/IMS networks, instant messaging networks, etc. This presence information may then be retrieved from the presence server by a presence client located on a user device, such as a cell phone. In many embodiments, it is expected that the presence module will be part of a telephony server. However, there are some embodiments where the presence information is stored in other locations, such as in a telephony client or telephony control point.

Perhaps even more interesting is the ability to expose presence information of users within the home network to users outside the home network. For example, information about how Joe is currently watching the Giants vs. Raiders game in the living room can be transmitted, or that Martha is currently listening to music in the bedroom.

Additionally, embodiments are foreseen where home network devices can be assigned to specific telephony servers (and thus to specific phone numbers). For example, Joe's home network devices may be assigned to both a shared household number and a private line, so that incoming phone calls on either phone number ring on Joe's devices.

Furthermore, in an embodiment of the present invention, an end-user policy is used to control the level of details of presence information that is revealed. This may be, for example, tailored to each line. For example, full details may be exposed over a private line, because callers or other inquirers on the private line are likely to be "authorized" by virtue of having been given the private phone number to begin with, whereas only partial details (e.g., Joe is somewhere in the home) may be exposed on the shared line. The level of information provided may also be controlled by other factors, such as the caller identity or the time of day.

FIG. 1 is a block diagram illustrating an architecture for providing presence information in a home network in accordance with an embodiment of the present invention. A presence server 100 may be located on or within a telephony server 102. It should be noted that it is not strictly necessary for the presence server 100 to be located on or within the telephony server 102, however in many embodiments that design may be preferable as the telephony server 102 is already designed to interact as a server within the home network. The presence server 100 can provide a registration action, allowing one or more presence control points 104a, 104b, 104c to register. The registration action allows each control point 104a, 104b, 104c to establish its own presence policy with the presence server 100. The presence server can provide a unique identifier on completion of each registration.

When the presence server 100 receives a request for presence information, it may respond to it immediately (proactive response) or may attempt to contact control points 104a, 104b, 104c that have registered with the presence server (reactive response). The presence server 100 initiates a request for reactive control point responses by sending an event that contains identifiers from previous control point registrations.

Each of the control points 104a, 104b, 104c monitors for presence events issued by the presence server 100. If a control point recognizes its unique identifier from a previous registration it can respond with an action to obtain call information from the telephony server 102. The control point can then formulate a presence response based on the call information and can issue a presence information action to provide this information to the presence server. These actions may be optionally sent over a secure session with the telephony server 102 and/or presence server 100 to protect inbound call information or presence information transmitted on the home network from being intercepted or modified.

The presence server 100 may also provide a default presence response if no control point responds to the presence event or of a control point indicates that the presence server 100 should always provide a response rather than attempting to contact the control point on each request from presence information.

Figure 2:
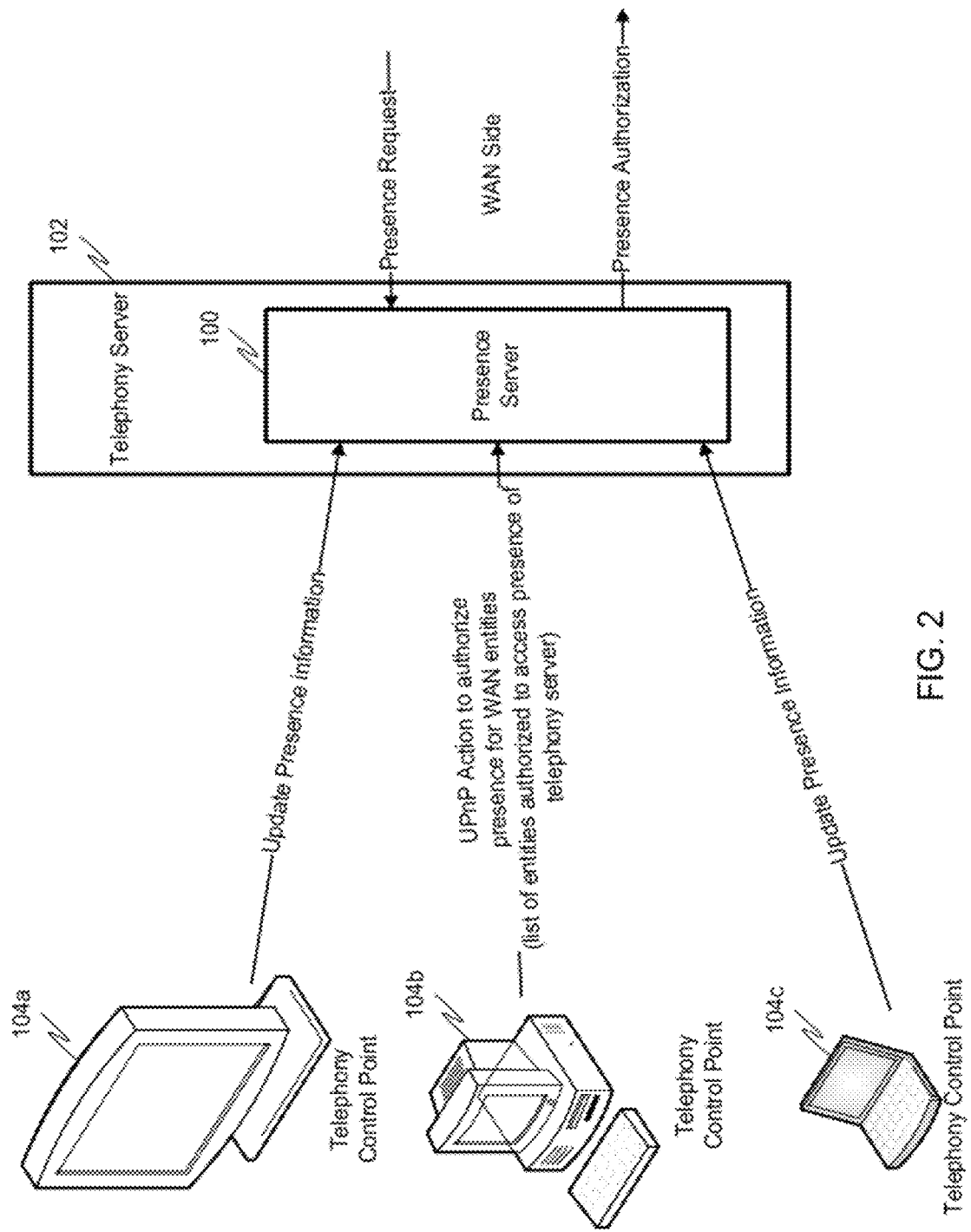
FIG. 2 is a diagram illustrating a reactive scenario in accordance with an embodiment of the present invention.

In the case of reactive authorization of a request for presence information, the control point publishes or updates the presence information (i.e., Jim is available to take calls in front of the TV, Paul is watching sitcoms in the bedroom, etc.) on the presence server by invoking an action, such as a UPnP action, on the presence server. When the presence server receives a request for the presence information from the wide area network (WAN) side, the presence server sends out event notifications to all the subscribed control points in the home network about the incoming requests. A control point can then accept or reject the request by invoking an action on the presence server, which is then propagated to the requester using a WAN-side protocol by the presence server. This is depicted generically in FIG. 2.

To realize a case where not all control points are allowed to accept or reject a presence request, additional requirements can be imposed on the control points and presence servers. The presence server can provide a mechanism to control points to register themselves with the presence server, and can even provide a separate authentication ID to each control point to allow for increased privacy.

In this scenario, the control point registers itself with the presence server using the control point name (e.g., Paul-Phone). The presence server then returns an authentication ID in response to this registration request. When a control point then receives an event for notification of an incoming request for presence information, the control point invokes an action on the presence server to allow or deny access to the presence information (and make that allowance or denial known to the requester over the WAN). When invoking the action to allow or deny access to presence information, the control point can supply the authentication ID received during the registration process. The presence server will then only accept the request from a control point that has supplied a valid authentication ID and is in the list of authorized control points to invoke this action. This list may be configured either directly, though a configuration page, or by an invoked action.

Figure 3:
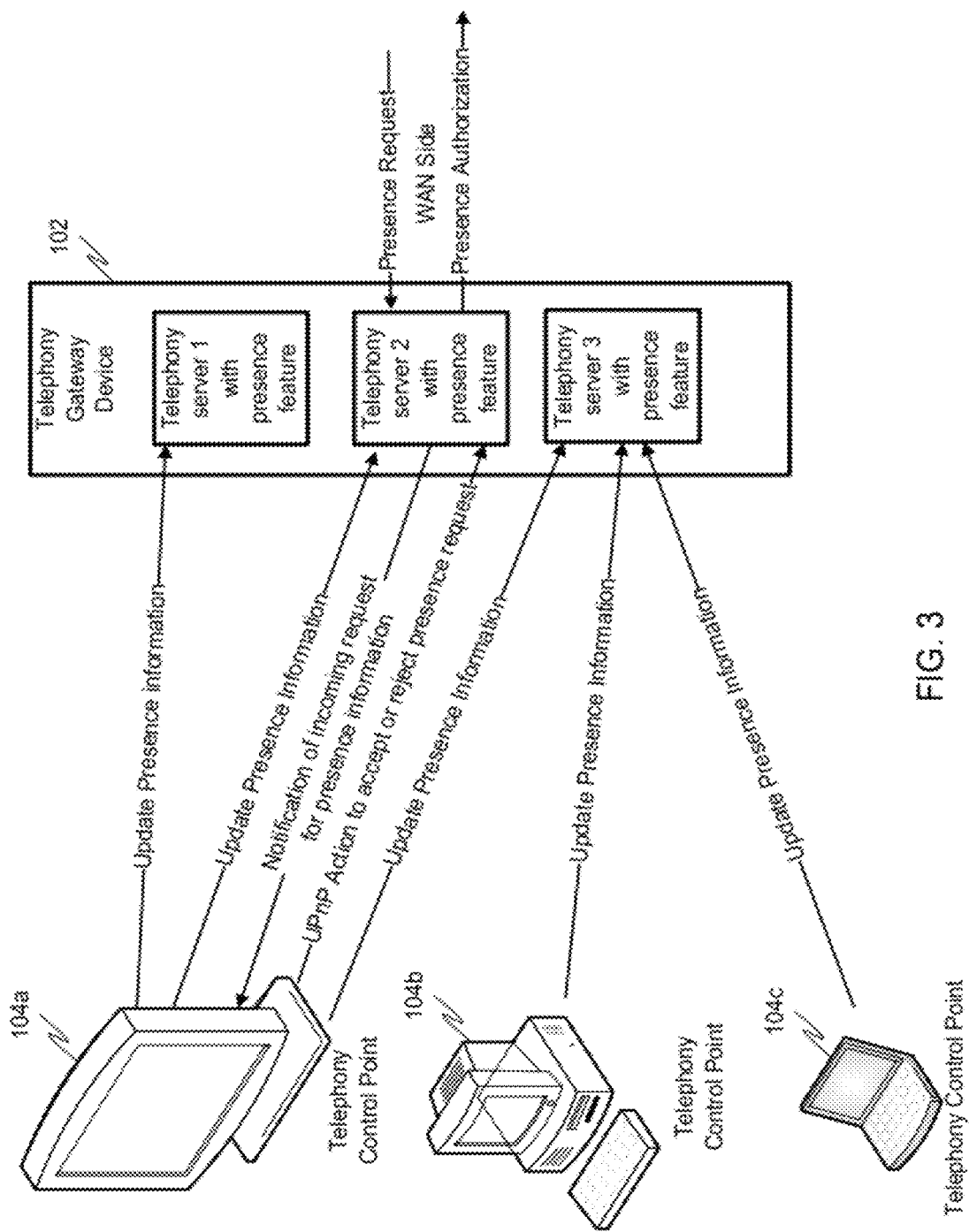
FIG. 3 is a diagram illustrating a proactive scenario in accordance with an embodiment of the present invention.

In the case of a proactive authorization for presence information, the list of entities on the WAN side that are authorized to view the presence information of the presence server can be set up by an action even before the request for presence information is received. In this scenario, a control point invokes an action with a list of WAN entities that are allowed to access the presence information relating to that control point. These entities can be identified by, for example, phone number or SIP URL. When the presence server receives a request to access presence information, the presence server then checks its internal database to see whether the entity is allowed to access the presence information. The server can then decide to allow or deny the request to the WAN side without even consulting the devices in the home network. This scenario is depicted in FIG. 3.

Presence information may be kept by the presence server per individual contact/user in its database. When sending out notifications to a client the presence server is able to filter out presence changes for this particular user/contact from all other users/contacts, thus sending only presence status relating to this particular user as notification.

In an embodiment of the present invention, presence information is transmitted from the presence server to UPnP devices such as a digital television and cell phones. The presence information may include availability information (i.e., information regarding whether certain users/callees are available at the moment). This allows a user to figure out whether his contacts, such as friends, family members, colleagues, etc., are busy, available to engage in a telephony call, or available to engage in a messaging session. For example, SIP provides for the ability to determine in real time whether a "buddy" in the cell phone user's frequent contacts list is available (e.g., cell phone is online and connected to the network, or available for text messaging, etc). This presence information can then be pushed from the cell phone to the digital television using the RUI. This allows, for example the user to see a list of friends who are available to receive a call or text message prior to initiating a call to one of the friends.

The user/callee presence information can be gathered from, for example, an IP Multimedia Subsystem (IMS) based system by subscribing to the presence/presence information of the user based on the SIP address of the user/callee. Despite the term "callee" being used throughout this document, the user presence refers not only to telephony calls but also for the presence of the user to engage in other tasks, such as an instant messaging session. The control point can gather the user's presence for instant messaging by monitoring the user's status on a particular instant messaging system such as Yahoo, AOL, MSN, etc. The aggregation of all presence information can be achieved by a control point (located, for example, on the device, such as a television) subscribing to all presence services residing in the UPnP network and receiving notifications of the statuses of the users/callees.

Figure 4:
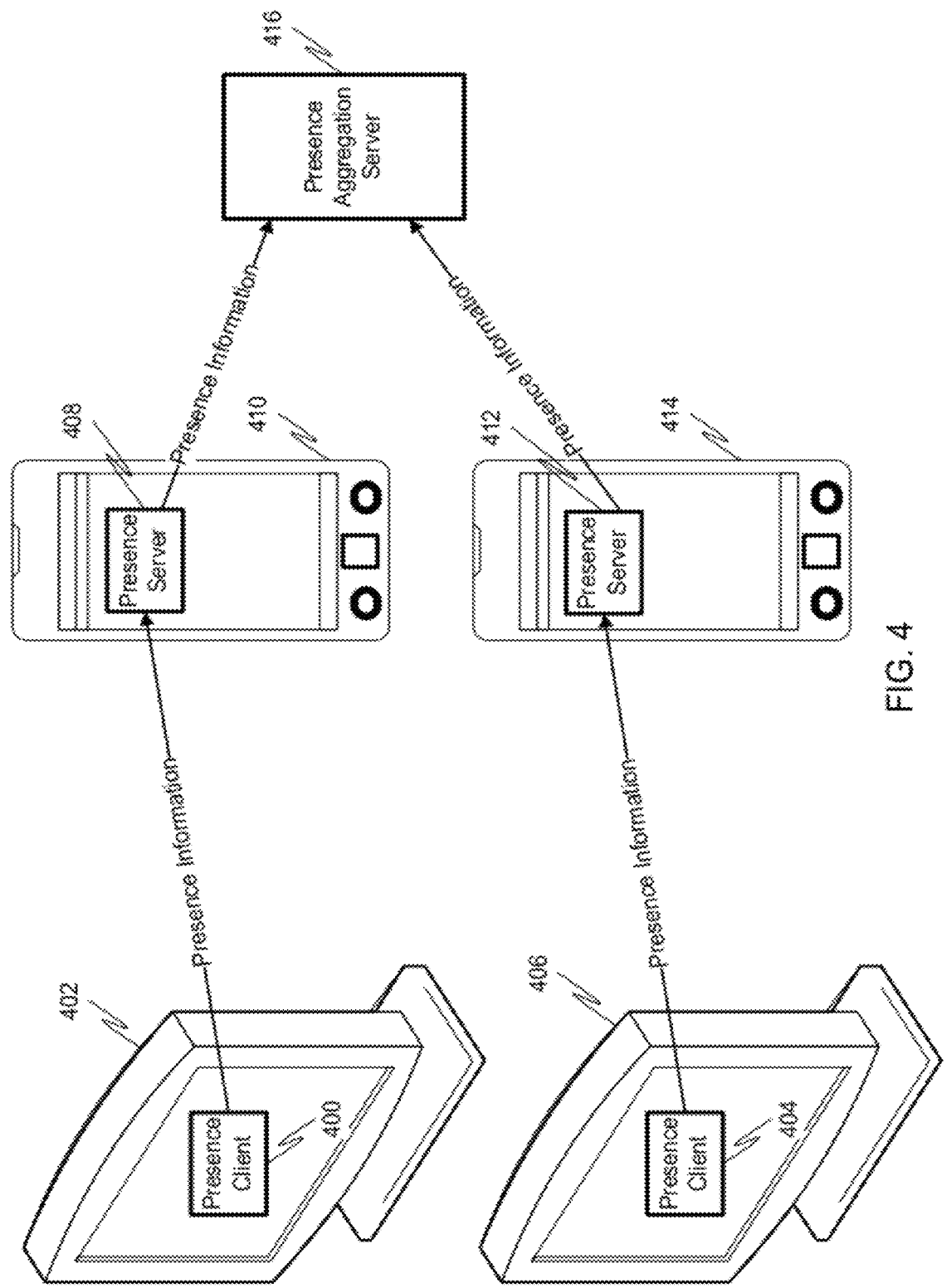
FIG. 4 is a diagram illustrating a system for aggregating presence information in a UPnP network in accordance with an embodiment of the present invention.

In an alternate embodiment of the present invention, presence information from multiple presence servers can be aggregated. FIG. 4 is a diagram illustrating a system for aggregating presence information in a UPnP network in accordance with an embodiment of the present invention. A UPnP presence client 400 may be located in a UPnP control point 402, such as television. Another UPnP presence client 404 may be located on another UPnP control point 406, such as a laptop computer. A first UPnP Presence Server 408 may be located on a first cell phone 410 and may gather presence information from UPnP control point 402 and other control points not pictured. A second UPnP Presence Server 412 may be located on a second cell phone 414 and may gather presence information from UPnP control point 406 and other control points not pictured. The UPnP presence servers 408, 412 are responsible for gathering and storing callee/user presence information. For example, a cell phone may gather presence of callee/user information by subscribing to the presence information of the user/callee using the SIP URL of the user/callee. In the case of presence of a user to engage in an instant messaging session, such information can be gathered by running messaging clients for existing messaging service provided by the cell phones. A presence aggregation server 414 may then aggregate presence information from multiple UPnP presence servers 408, 412.

In an embodiment of the present invention, a state variable is defined by the UPnP Presence server that provides the following information for a user:
 a. User/Callee availability (e.g., Offline or Online)
 b. User/Callee Location (e.g., geographic location)
 c. User/Callee's phone capability (e.g., video call-capable)
An example schema for the above-described state variable is:

```
<?xml version="1.0"?>
<Presence>
    xmlns="urn:schemas-upnp-org:cs"
    xmlns:xsd="http://www.w3.org/2001/XMLSchema"
    xmlns:xsi="http://www.w3.org/2001/XMLSchema-instance"
    xsi:schemaLocation="urn:schemas-upnp-org:presence
    http://www.upnp.org/schemas/availabilty/presence-v1-
    20070XXXX.xsd">
    <Status>Represent User's Status</Status>
    <Location>User/Callee's Location</Location>
    <Capability>Capability for the phone of the callee</Capability>
</Presence>
```

It should be noted that embodiments are envisioned wherein additional presence information, such as device information, is also supported. Nothing in the above section shall be construed as limiting the presence information to particular types.

The UPnP Presence Aggregation Server 416 may receive notification of presence changes from the Presence Servers 408, 412 and then aggregate the information. This may include calling a SOAP action to retrieve presence as required. The UPnP Presence Aggregation Server 416 can be located on any device, but in one embodiment of the present invention it is located on a UPnP device (e.g., television).

It should be noted that throughout this document, the term "user" as it pertains to a device associated with a UPnP presence server shall be defined as a user of services provided by a device that hosts or otherwise interacts with a presence client. The delivery of presence information may take many forms, depending upon the user interface implemented on the client. For example, the user may be presented with a "buddy list" on the screen of a UPnP enabled television. When a change occurs in the presence of one of the "buddies" on this list, the list may be altered. For example, a buddy who is no longer available may be removed from the list or an icon next to the buddy's name may be changed to indicate the buddy is no longer available. Similarly, if the change reflects the buddy becoming available, the buddy's name may be added to the list or an icon next to the buddy's name may be changed to indicate the buddy is now available.

Figure 5:
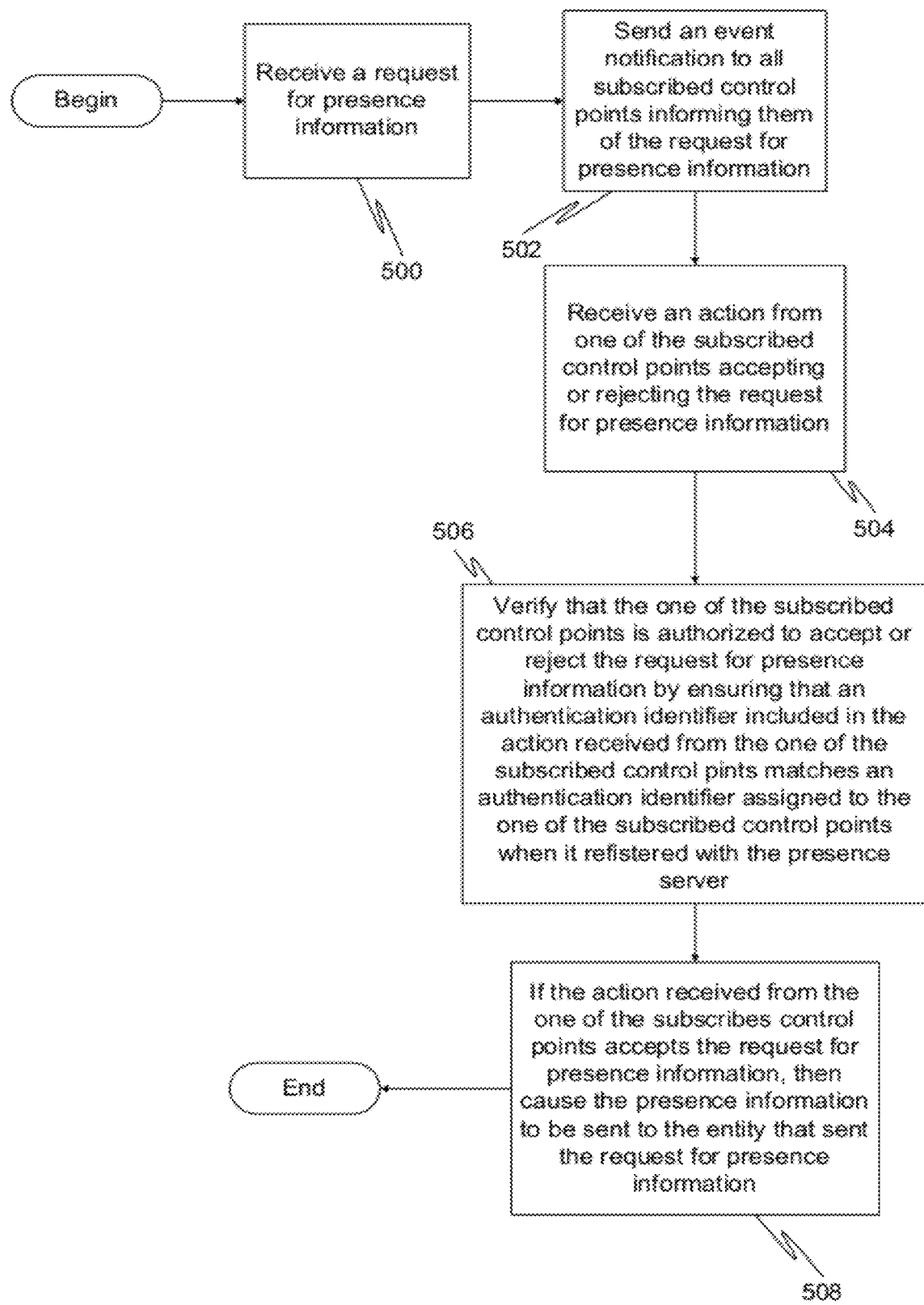
FIG. 5 is a flow diagram illustrating a method for operating a presence server in a home network in accordance with an embodiment of the present invention.

FIG. 5 is a flow diagram illustrating a method for operating a presence server in a home network in accordance with an embodiment of the present invention. This embodiment pertains to a "reactive" scenario. At 500, a request for presence information is received. This may be received, for example from a WAN device. At 502, an event notification is sent to all subscribed control points informing them of the request for presence information. At 504, an action is received from one of the subscribed control points accepting or rejecting the request for presence information. At 506, it may be verified that the one of the subscribed control points is authorized to accept or reject the request for presence information by ensuring that an authentication identifier included in the action received from the one of the subscribed control points matches an authentication identifier assigned to the one of the subscribed control points when it registered with the presence server.

At 508, if the action received from the one of the subscribed control points accepts the request for presence information (and, if necessary, the one of the subscribed control points is verified), then presence information regarding the one of the subscribed control points is caused to be sent to the entity that sent the request for presence information.

Figure 6:
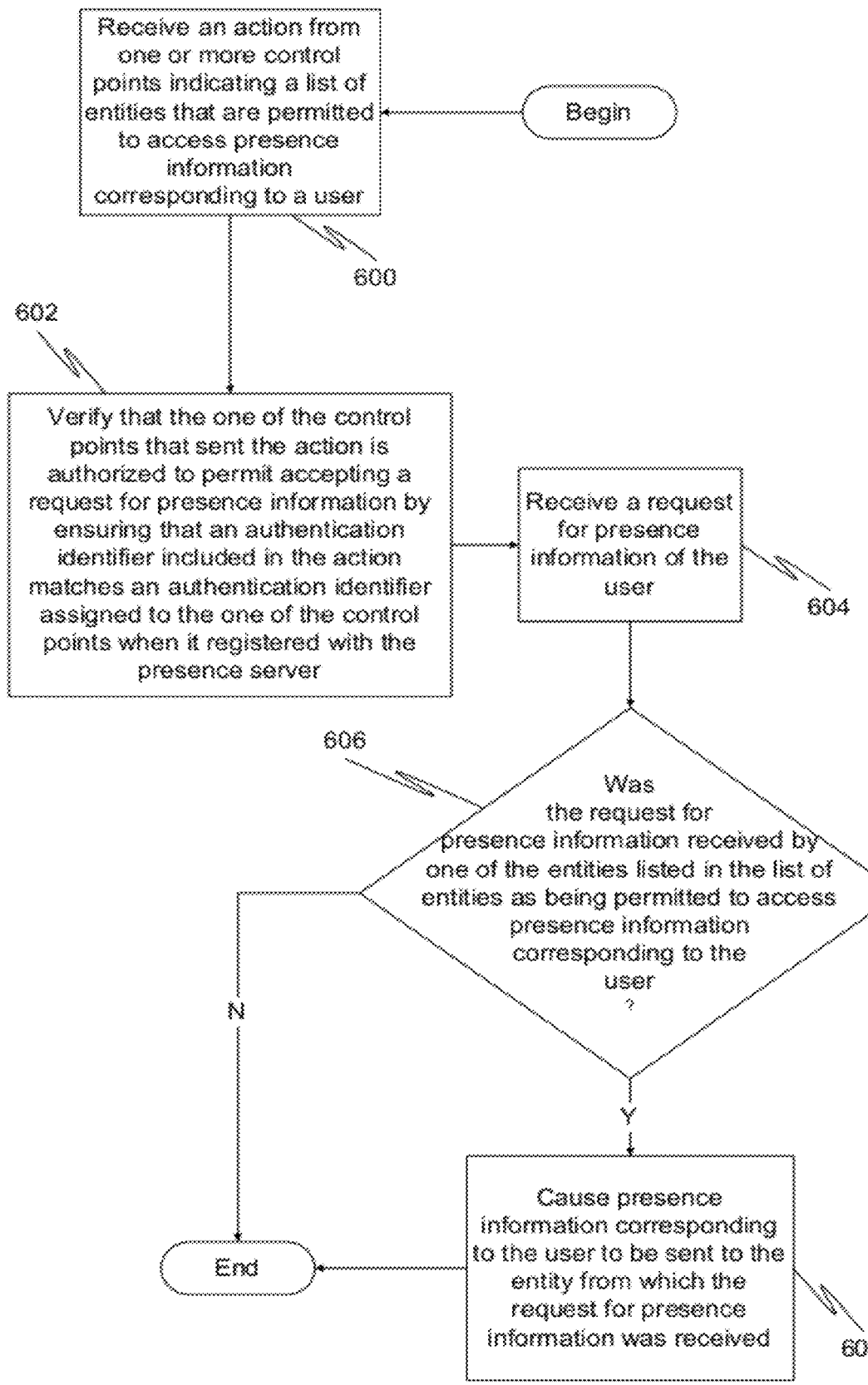
FIG. 6 is a flow diagram illustrating a method for operating a presence server in a home network in accordance with another embodiment of the present invention.

FIG. 6 is a flow diagram illustrating a method for operating a presence server in a home network in accordance with another embodiment of the present invention. At 600, an action is received from one or more control points in the home network indicating a list of entities that are permitted to access presence information corresponding to a user. At 602, it may be verified that the one of the control points that sent the action is authorized to permit accepting a request for presence information by ensuring that an authentication identifier included in the action matches an authentication identifier assigned to the one of the control points when it registered with the presence server. At 604, a request for presence information of the user is received. At 606, it is determined if the request for presence information was received by one of the entities listed in the list of entities as being permitted to access presence information corresponding to the user. At 608, presence information corresponding to the user is caused to be sent to the entity from which the request for presence information was received based on the determination and not based on consulting control points in the home network at the time the request for presence information is received. In other words, if the determination indicates that it is permitted to send the presence information to that entity, the presence information is sent, without actually sending an action to the appropriate control points for permission.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

Figure 7:
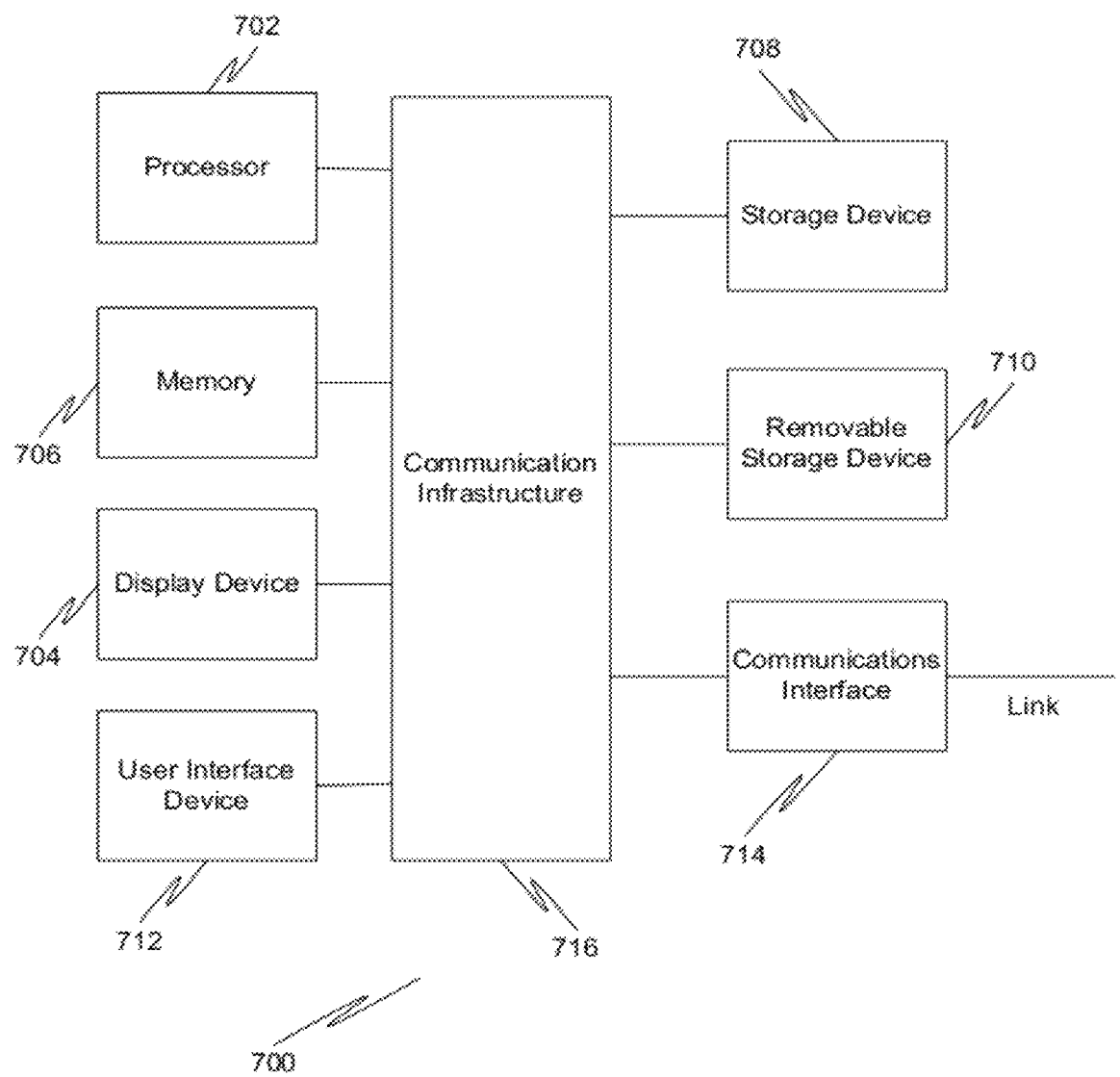
FIG. 7 is a high level block diagram showing a computer system in accordance with an embodiment of the present invention.

FIG. 7 is a high level block diagram showing a computer system in accordance with an embodiment of the present invention. The computer system 700 is useful for implementing an embodiment of the disclosed invention. The computer system 700 includes one or more processors 702, and further can include an electronic display device 704 (for displaying graphics, text, and other data), a main memory 706 (e.g., random access memory (RAM)), storage device 708 (e.g., hard disk drive), removable storage device 710 (e.g., optical disk drive), user interface devices 712 (e.g., keyboards, touch screens, keypads, mice or other pointing devices, etc.), and a communication interface 714 (e.g., wireless network interface). The communication interface 714 allows software and data to be transferred between the computer system 700 and external devices via a link. The system may also include a communications infrastructure 716 (e.g., a communications bus, cross-over bar, or network) to which the aforementioned devices/modules are connected.

Information transferred via communications interface 614 may be in the form of signals such as electronic, electromagnetic, optical, or other signals capable of being received by communications interface 614, via a communication link that carries signals and may be implemented using wire or cable, fiber optics, a phone line, a cellular phone link, a radio frequency link, and/or other communication channels. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for operating a presence server in a home network, the method comprising:
   receiving, by a presence server device, a request for presence information;
   sending, from the presence server device, an event notification to all subscribed control points informing all of the subscribed control points of the request for presence information;
   establishing, by each subscribed control point, a particular presence policy with the presence server device for controlling a level of details of presence information that is tailored for one or more telephone lines;

receiving, by the presence server device, an action from one of the subscribed control points accepting or rejecting the request for presence information; and verifying that the one of the subscribed control points is authorized to accept or reject the request for presence information, and causing presence information regarding the one of the subscribed control points to be sent to an entity that sent the request for presence information based on accepting the request for presence information, wherein upon a control point recognizing its unique identifier from a previous registration, the control point responds with an action to obtain call information from the presence server device, and the control point formulates a presence response based on the call information and issues a presence information action to provide the presence information to the presence server device.

2. The method of claim 1, wherein the request for presence information is received from a wide area network (WAN).

3. The method of claim 1, wherein verifying that the one of the subscribed control points is authorized to accept or reject the request for presence information comprises ensuring that an authentication identifier included in the action received from the one of the subscribed control points matches an authentication identifier assigned to the one of the subscribed control points when it registered with the presence server device.

4. The method of claim 1, wherein the presence server device is located on a telephony server in a universal plug and play (UPnP) network, wherein each particular presence policy controls a level of details of presence information that is revealed, wherein the level of details of presence information is based on a type of telephone line.

5. The method of claim 4, wherein the type of telephone line is one of shared and private.

6. The method of claim 1, wherein multiple subscribed control points receive the event notification informing the multiple subscribed control points of the request for presence information.

7. A telephony server comprising:
a telephony module having both hardware and software that receives incoming phone calls and assigns the incoming phone calls to one or more devices in a home network; and
a presence server that:
receives a request for presence information;
sends an event notification to all subscribed control points informing them of the request for presence information, wherein each subscribed control point is configured for establishing a particular presence policy with the presence server that is tailored for one or more telephone lines;
receives an action from one of the subscribed control points accepting or rejecting the request for presence information; and
if the action received from the one of the subscribed control points accepts the request for presence information and is verified as authorized to accept or reject the request for presence information, causes presence information regarding the one of the subscribed control points to be sent to an entity that sent the request for presence information, wherein upon a control point recognizing its unique identifier from a previous registration, the control point responds with an action to obtain call information from the presence server, and the control point formulates a presence response based on the call information and issues a presence information action to provide the presence information to the presence server.

8. The telephony server of claim 7, wherein the telephony server is compatible with the Universal Plug and Play (UPnP) protocol, wherein each particular presence policy controls a level of details of presence information that is revealed.

9. The telephony server of claim 8, wherein the telephony server transmits presence information to UPnP devices in a UPnP network.

10. The telephony server of claim 7, wherein the presence information is more limited if a phone number associated with the telephony server is a shared phone number as opposed to a private phone number.

11. The telephony server of claim 7, wherein the presence information is limited based at least partially on an identity of the entity requesting presence information.

12. The telephony server of claim 7, wherein the presence information is limited based at least partially on time of day.

13. A non-transitory program storage device readable by a machine embodying a program of instructions executable by the machine to perform a method for operating a presence server in a home network, the method comprising:
receiving a request for presence information;
sending an event notification to all subscribed control points informing them of the request for presence information, wherein each subscribed control point is configured for establishing a particular presence policy that controls a level of details of presence information that is revealed and that is tailored for one or more telephone lines;
receiving an action from one of the subscribed control points accepting or rejecting the request for presence information; and
accepting the action;
verifying the one of the subscribed control points as authorized to accept or reject the request for presence information; and
causing presence information regarding the one of the subscribed control points to be sent to an entity that sent the request for presence information,
wherein upon a control point recognizing its unique identifier from a previous registration, the control point responds with an action to obtain call information from the presence server, and the control point formulates a presence response based on the call information and issues a presence information action to provide the presence information to the presence server.

14. The non-transitory program storage device of claim 13, wherein the method further comprises:
if no subscribed control point responds to a particular request for presence information, accessing and utilizing a default presence response.

* * * * *